Patented June 12, 1951

2,556,483

UNITED STATES PATENT OFFICE 2,556,483

SEPARATION METHOD

Norman E. Peery, San Francisco, and Donald L. Cleveland and John A. Hatton, Long Beach, Calif., assignors to Shell Development Company, San Francisco, Calif., a corporation of Delaware No Drawing. Application June 19, 1945,
Serial No. 600,418

4 Claims. (Cl. 209—127)

This invention relates to a method for the separation of activatable materials from non-activatable materials in ores, earth minerals and the like by a combination of process steps comprising activating the material, preconditioning the material, and separating by means of a high potential electric field.

The basic separation method used in the dressing of ores, earth minerals and the like depend upon differences in the properties of the constituents such, in particular, as friability, tendency to decrepitate upon heating, specific gravity, magnetic susceptibility, wetting properties, dielectric properties, solubility, and particle shape. The method of the present invention makes use of the differences in the abilities of different materials to be converted by simple treatments into a so-called activated or adsorptive form.

For the purpose of describing and defining the present invention, an activatable material is considered to be a material which may be converted by simple methods from an inactive form into a so-called activated form, i. e. having a microporous structure, an appreciable so-called inner surface and having an appreciable adsorption ability. A typical example of an activatable material is, for instance, the hydrous alumina constituent of bauxites. High grade bauxite, for example, may be converted into an activated bauxite having pronounced adsorptive characteristics by a simple activation treatment. A non-activatable material is considered to be a material which is not converted into an activated form by such simple activating treatments. A typical example of a non-activatable material is, for instance, non-hydrous silica. An activation treatment is a treatment which renders a relatively non-adsorptive material into a relatively adsorptive material by producing within the material a microporous structure.

Whether a material is activatable or not depends upon its structure and composition. The ability to be activated depends among other things upon a more or less even distribution throughout the material of a material which may be more or less easily removed. In general, this material which is removed is water (adsorbed water, water of crystallization, water of constitution, i. e. hydroxyl water); however, it may also be other materials as, for instance, organic matter, sulfate, or carbonate. Materials, on the other hand, which contain little or none of such removable material are either non-activatable or activatable only to a slight degree. By the removal of a part or all of such removable material without appreciably disrupting the structure, extremely small voids are formed and these voids lend adsorptive properties to the material. The activation of such materials is generally effected by subjecting the material to a controlled calcination treatment. In some instances, however, other treatments such as leaching are applicable.

In many instances ores, earth minerals and also other materials are found which contain constituents which are quite similar in many respects and which are difficult or impossible to separate by the known basic separation methods. In many instances it will be found that one or more of the constituents is capable of being more or less selectively brought into a so-called activated state. In such instances the materials may be separated into two or more fractions or concentrates by the method hereinafter described.

The first step in the separation method of the invention is to bring the crude material, if it is not already in such state, to a suitable particle size. The material should be reduced to a particle size substantially freeing the constituents to be separated as discrete particles. Complete separation (freeing) of the particles is not necessary nor usually possible; however, a relatively good separation is desirable. The material should furthermore be ground or crushed to pass a 6-mesh sieve or thereabouts and preferably should be retained on a 200-mesh sieve. The particles of a particular material may vary between these approximate limits, but it is preferable to have a fairly uniform particle size. For example, a suitable material might pass a 40-mesh sieve and be retained on a 100-mesh sieve.

The second step in the separation method of the invention is to subject the material to a suitable activation treatment to more or less selectively activate the activatable or more easily activatable constituent or constituents. Any of the activation treatments such as commonly applied in the production of activated alumina, activated silica gel, activated magnesia and activated carbon may be utilized. In general, as explained above, the activation is effected by simply calcining the material under controlled conditions. The calcination should be sufficiently severe to remove a large part of the combined water or other volatile constituents and produce a suitable activation, but should not be so severe as to cause appreciable deactivation of the activated material as by sintering or fusion. In general, temperatures in the range of 300° C. to 900° C. will be found suitable. The calcination may be carried out, for example, by simply passing the material through a rotating kiln with a flow of gas passing therethrough to remove the liberated vapors.

In general, it is preferred to effect the activation treatment after grinding and sizing. However, this order is not essential in most cases and may be reversed.

The third step in the separation method of the invention is to treat the material with a material which when adsorbed by the solid particles will decrease the dielectric constant of the particles. For this purpose, conducting materials or electrolytes are used. The solid particles may be treated with a solution of a suitable electrolyte. However, a preferred method is to treat the material with steam containing a volatile electrolyte. Suitable materials for this treatment are, for example, boric acid vapor, sulfur dioxide, and ammonia vapor. Thus, for example, this treatment may be effected simply by passing the material through a rotating drum through which a mixture of air, steam and ammonia is recycled. The amount of electrolyte used and the time of contact should be adjusted such that the activated particles have opportunity to adsorb a part of the electrolyte. Even relatively small amounts of ammonia are quite effective. An excess is, however, not detrimental. In one case, for instance, an amount of ammonia equivalent to 10 pounds per ton appeared to be about optimum. The agent used can be largely recovered and reused, if desired, by simply heating the final product (in the case of such materials as ammonia) or by leaching.

The fourth step in the process of the present invention is the separation of a concentrate of activated particles from the non-activated or less activated particles by the use of one of the known electric separation methods wherein the particles are separated in accordance with their susceptibility to influence by a high potential electrical field. In the above-described third step of the process, the particles adsorb the relatively more conducting material in proportion to their respective degrees of activity. The activated particles are thereby considerably changed in their electrical properties being much more susceptible to ionic charging. Any of the known electrical separation devices adopted to operate with substantially dry (that is, not moist to appearance and feel) pulverulent or granular material, and depending upon the effect of a high potential electric field upon such particles, may be employed. When treating relatively granular or coarse powders, the class of separation devices wherein the particles are fed downward through the electric field are preferred. On the other hand, when treating very fine powders, satisfactory separation has been obtained by suspending the powder in a stream of gas and passing it through a Cottrell-type separator.

It should be noted that the above-described separation method is not necessarily a complete solution to many of the separation problems in which it may be employed. Thus, the method of the invention may be applied in conjunction with other separation methods, in which case it may serve primarily to increase the efficiency of another method as, for instance, by removing a material which interferes.

While the invention has been described in particular relation to application in the field of separation of mineral materials, it is believed that it is of broader application. Thus, it is believed that it will be found applicable in the allied fields with non-mineral materials. For instance, in the production of such materials as activated coke, activated charcoal, activated bone char and the like, it is known that certain parts of the coke, nut shells, fruit pits, bones, etc., used as raw materials are less amenable to activation than other parts and tend to degrade the product. It is believed that if such raw materials are treated as described above the operation will result in the production of concentrates of more and less active particles and thereby allow the production of a superior product and/or allow the use of cheaper raw materials which ordinarily afford only poor quality products.

We claim as our invention:

1. Method for the separation of heterogeneous mixtures of relatively activatable and relatively non-activatable constituents which comprises calcining a heterogeneous mixture of particles of relatively non-activatable and relatively activatable material containing bound water to remove a part of the bound water from the relatively activatable material thereby rendering the same microporous, adsorbing an electrolyte on the constituents of the resulting material in amounts substantially proportional to their surfaces by bringing said material into contact with vapors of said electrolyte, and then separating the material in the form of discrete particles passing a 6-mesh sieve into a concentrate of activated particles having the electrolyte adsorbed therein and a concentrate of relatively non-activated particles by means of a high potential electric field.

2. The method according to claim 1 wherein the electrolyte is ammonia and the electrolyte is adsorbed on the material by bringing it into contact with ammonia vapors in the presence of steam.

3. Method for the separation of relatively non-activatable constituents from water-bearing relatively activatable constituents in mixtures containing the same which comprises the steps of reducing the crude material to a particle size substantially freeing said constituents as discrete particles and at least passing a 6-mesh sieve, subjecting the material to a calcination treatment wherein said activatable constituent is brought to a form having a microporous structure with appreciable inner surface and adsorption ability, said calcination treatment being controlled to remove most of the bound water from the activatable constituent but insufficient to cause appreciable sintering, adsorbing an electrolyte on the mixed calcined particles in amounts substantially proportional to their surfaces by bringing said particles into contact with said electrolyte, and then separating the activated particles from the non-activated particles by means of a high-potential electric field.

4. The method according to claim 3 wherein the electrolyte is ammonia and the electrolyte is adsorbed by bringing the particles into contact with ammonia vapors in the presence of steam.

NORMAN E. PEERY.
DONALD L. CLEVELAND.
JOHN A. HATTON.

REFERENCES CITED

The following references are of record in the file of this patent:

UNITED STATES PATENTS

| Number | Name | Date |
| --- | --- | --- |
| 959,646 | Swart | May 31, 1910 |
| 2,090,418 | Johnson | Aug. 17, 1937 |
| 2,206,337 | Steele | July 2, 1940 |
| 2,245,200 | Johnson | June 10, 1941 |
| 2,356,717 | Williams | Aug. 22, 1944 |
| 2,412,868 | Brown | Dec. 17, 1946 |
| 2,430,015 | Hatton | Nov. 4, 1947 |

OTHER REFERENCES

"Contact Potential in Electrostatic Separation," by F. Fraas and O. C. Ralston, Bureau of Mines, Report of Investigations R. I. 3667, November 1942, pp. 10 and 11.